Nov. 9, 1926.  1,606,082

W. G. KIRCHHOFF

CUT-OFF DEVICE

Filed May 1, 1924  2 Sheets-Sheet 1

Inventor
WILLIAM G. KIRCHHOFF,

By Murray and Gugelter
Attorneys

Nov. 9, 1926.
W. G. KIRCHHOFF
1,606,082
CUT-OFF DEVICE
Filed May 1, 1924
2 Sheets-Sheet 2
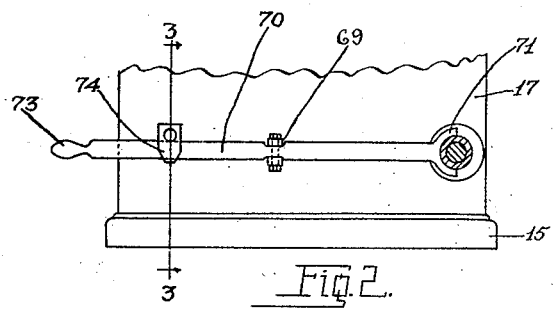
Fig. 2.
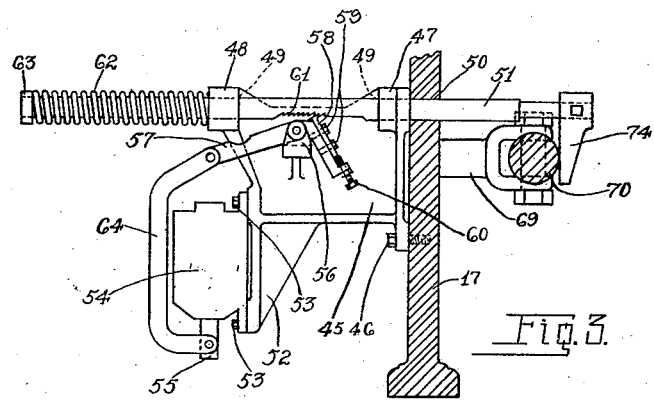
Fig. 3.
Fig. 4.
Inventor
WILLIAM G. KIRCHHOFF,
By Murray and Gugeller
Attorneys Patented Nov. 9, 1926.

1,606,082

UNITED STATES PATENT OFFICE.

WILLIAM G. KIRCHHOFF, OF CINCINNATI, OHIO, ASSIGNOR TO THE J. H. DAY COMPANY, OF CINCINNATI, OHIO, A CORPORATION OF OHIO.

CUT-OFF DEVICE.

Application filed May 1, 1924. Serial No. 710,469.

The invention is adapted primarily for use with flour sifting and weighing mechanism for dough mixers, but as will be noted hereafter may well be adapted to use with other types of machinery.

An object of my invention is to provide an automatic cut off device whereby power machinery is automatically stopped after having accomplished a certain predetermined operation.

Another object is to provide a device of this character whereby accurate measuring of flour may be accomplished without requiring the attention of an operator.

Another object is to provide a device whereby a saving of time and power may be effected.

These and other objects are attained by the means described herein and disclosed in the accompanying drawings, in which:

Fig. 2 is a fragmental view taken on line 2—2 of Fig. 1.

Fig. 3 is a view taken on line 3—3 of Fig. 2.

Fig. 4 is an electrical wiring diagram setting forth in a conventional manner the wiring.

Figure 1:
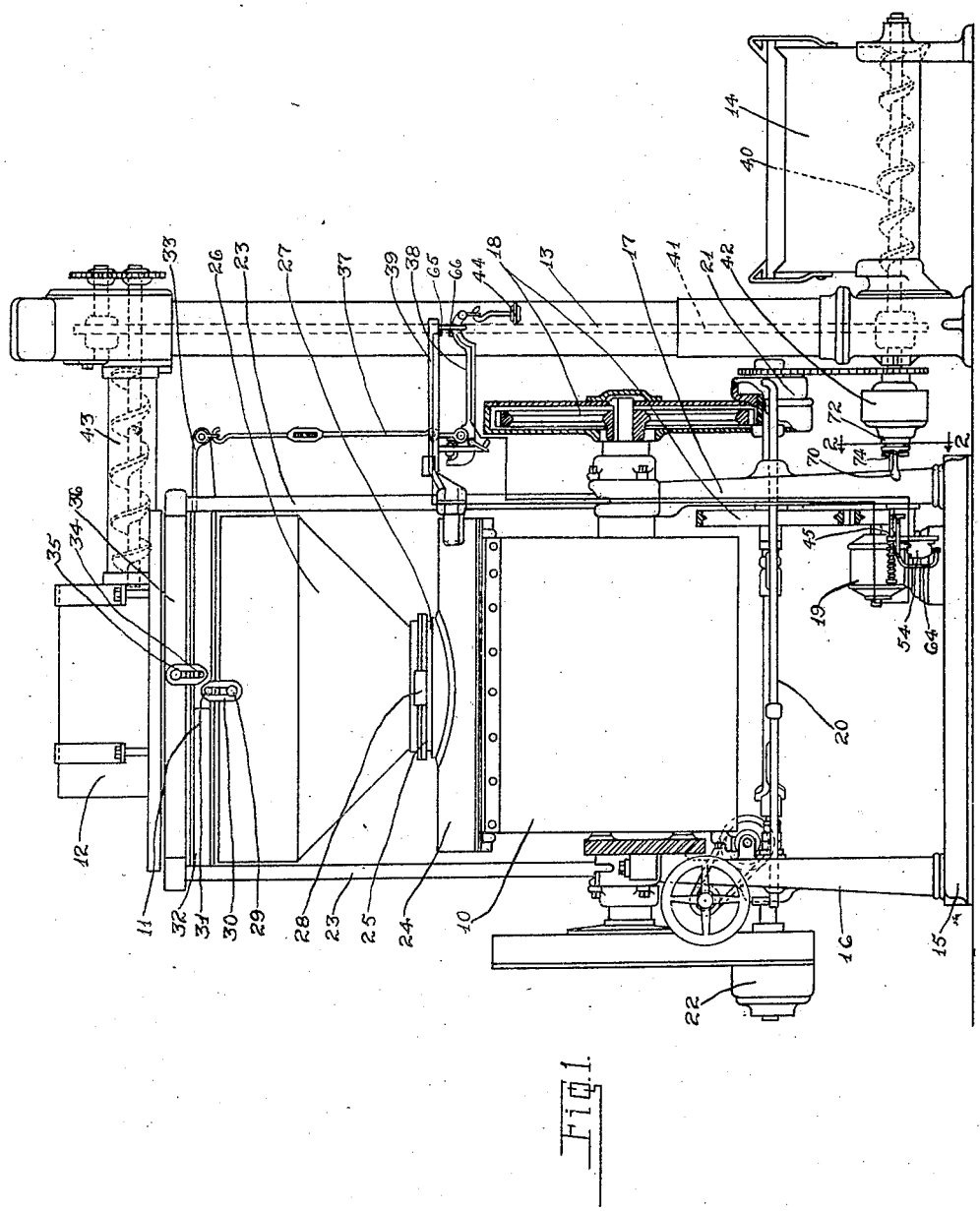
Fig. 1 is a side elevational view of a dough mixing machine having a device of my invention operatively applied to the flour sifting and weighing mechanisms thereof.

The dough mixing machine to which the device of my invention is applied comprises a frame supporting a dough mixing bin 10, a flour weighing device 11 adapted to discharge into the dough mixing bin, a sifting mechanism 12 adapted to discharge into the flour weighing device 11 and a conveying mechanism 13 which receives flour from a supply bin 14 and discharges it into the sifter 12. The supporting frame consists of a base 15 having uprights 16 and 17 between which the dough mixing bin 10 is journaled. A suitable mixing paddle (not shown) is contained within the mixing bin 10 and is adapted to be actuated by gearing 18 driven from a suitable source of power such as a motor 19. A shift bar 20 is adapted to actuate clutches 21 and 22 for controlling operation of the mixing paddles.

The flour weighing mechanism 11 is supported above the mixing bin 10 on standards 23 which are mounted upon uprights 16 and 17 and extend upwardly therefrom. A cover 24 for the mixing bin 10 is mounted on the standards 23 and is provided with an opening 25 through which flour may pass from the weighing device 11. The flour receptacle 26 of the weighing device 11 has an aperture 27 provided with a slidable closing means 28 to control the discharge of flour from the receptacle 26. The receptacle 26 is suspended from a bar 29, the opposite ends of which extend through chain links 30. The chain links 30 are supported upon knife edged lugs 31 which extend from opposite sides of the ring 32 which extends about the receptacle 26 and carries an arm 33. The ring 32 and arm 33 serve as a scale beam. A second set of knife edged lugs 34 extending from the ring 32 engage in chain links 35 suspended from a ring 36 mounted upon the standards 23. A connecting rod 37 extends from the arm 33 to a scale beam 38 which is mounted upon one of the standards 23. Associated with the scale beam 38 are the usual attachments employed with a scale such as the upper rigid beam 39 against which the scale beam may move.

The conveying mechanism 13 receives flour from the supply bin 14 through the agency of a spiral feed screw 40. The flour is transferred to a substantially vertical bucket conveyor 41 which is driven through a clutch 42 from a sprocket which is actuated by the gearing 18. At the upper end of bucket conveyor 41 the flour is discharged into a horizontal conveyor 43 through which it is carried to a cylindrical sieve of the rotary sifting mechanism 12. The sieve is suitably encased to preclude entry of dust and foreign matter.

Thus when the clutch 42 is thrown in, flour is fed from the supply bin 14 to the conveyor 41 through conveyor 43 to sifter 12 where it is sifted and discharged into the container 26. The scale beam is in a state of balance when container 26 is empty so that when a weight 44 is placed on the end of the scale beam 38 a certain corresponding quantity of flour (by weight) will be required to tip the scale beam as is customary in beam scales.

The device of my invention comprises an electrically controlled spring actuated mechanism for cutting off the flow of flour into the flour container 26 when the desired quantity of flour has been deposited therein. While the device is disclosed herein in practical cooperation with a dough mixing machine, it will be clear to those skilled in the art, that the device may also be employed with other machines to advantage.

A bracket 45 is secured to the upright 17 by means of suitable bolts 46. The bracket 45 carries at its top two spaced bearings 47 and 48 having aligned bearing bores 49. The upright 17 is also provided with a bore 50 which registers with the bearing bores 49. A plunger rod 51 is mounted for reciprocation through the bearing bores 49 and extends through the bore 50 in the upright 17. A depending flange 52 extends downwardly from bracket 45 and has mounted thereon by any suitable means such as bolts 53 an electromagnet 54 having an armature 55 adapted to be drawn upwardly when the electromagnet 54 is energized. A lug 56 having a bore therein provides a pivotal mounting for a lever 57 which carries a lever pawl 58. The pawl 58 is located at the end of the lever 57 adjacent the pivotal mounting thereof and is provided with suitable adjustment means, such as elongated perforation through which bolts 59 may pass into threaded bores in the end of lever 57. A set screw 60 is adapted to abut the end of pawl 58 and provide a retaining and adjustment means therefor. The plunger rod 51 is provided with ratchet teeth 61, between which the pawl 58 may engage for retaining the plunger rod 51 in position against the resistance of a compression spring 62 mounted about the plunger rod and having its ends in abutment with the bearing 48 and a collar 63 fixed to the end of the plunger rod.

A magnet link 64 is substantially U-shaped and is pivotally mounted at its one end to the free end of lever 57, and extends about the magnet 54 and has its other end pivotally mounted adjacent the protruding end of armature 55. Electrical contacts 65 and 66 are mounted upon the rigid beam 39 and swinging scale beam 38 respectively upon suitable blocks of electricity insulating material and are adapted to contact one with the other when the scale portion of the weighing mechanism is tipped. The end of the windings of electromagnet 54 are connected by means of wires 67 and 68 to the contacts 65 and 66 and a suitable source of electrical energy is supplied within the circuit. In the diagram in Fig. 4 the source of electricity is shown as a conventional electric battery, however, the current may be supplied through the lines feeding the motor 19.

The upright 17 carries a forked arm 69 having a clutch lever 70 pivotally mounted thereon. A clutch fork 71 at one end of the lever 70 engages the clutch 72 and a handle 73 at the other end of the lever provides means for manually shifting the clutch 72 into and out of driving engagement with the conveying mechanism 13.

The end of the plunger rod 51 extending beyond the upright 17 is provided with a dog which may engage the clutch lever 70.

In operation the operator desiring to mix a certain quantity of dough, sets the scale so that the scale beam 38 will tip when the desired amount of flour has been discharged into container 26. He then throws the clutch 72 into driving position by means of lever 70 and in doing so the dog 74 on plunger rod 51 is moved by the lever against the yielding resistance of spring 62. The weight of armature 55 bears downwardly on magnet link 64 which raises the end of lever 57 so that the pawl 58 may engage the teeth 61 on the plunger rod. Thus the pawl will retain the rod 51 in its extended position against the pressure of the spring 62. Flour is now conveyed from the bin 14 to the bucket conveyor 41, through the horizontal conveyor 43 into the sifter 12 where it is sifted and discharged into container 26. When the predetermined amount of sifted flour has been discharged into the container 26 the scale beam 38 is raised through the agency of arm 33 and connecting rod 37 which brings contacts 65 and 66 into contact and closes the electrical circuit. When the electrical circuit is closed the electromagnet 54 is energized and armature 55 is drawn upwardly. This raises the magnet link 64 and the outer end is thereby raised, moving the lever 57 about its pivotal mounting on the lug 56 and moving the pawl 58 out of engagement with the teeth 61 on the plunger rod whereupon the spring 62 shifts the plunger rod 51 and the dog 74 thereon whereby the clutch lever 74 is moved and the clutch 72 thrown into an inoperative position. The conveying mechanism is thus stopped immediately. It should be noted that during the sifting and weighing operation, the attention of the operator is not required. Thus one quantity of flour may be discharged into the dough mixer 10 and the mixing operation begun and the conveying and sifting mechanism may at the same time be put in operation after which the operator may leave the machine for other duties while the required quantity of flour will again be sifted and discharged into container 26 and the sifter and conveyor will automatically be shut off and all will be in readiness for the operator when he wishes to remove the dough from the mixer 10 and start a new batch of dough.

An economy of labor and power is thus effected by the use of a device of my invention.

What I claim is:

1. In a device of the class described the combination with a clutch and pivotally mounted clutch lever, of a spring controlled plunger rod adapted to engage the clutch lever, means for retaining the plunger rod in an extended position and electrically operated means for releasing the retaining means whereby the plunger rod may actuate the clutch lever for disengaging the clutch.

2. In a device of the class described the combination with a container, of a conveyor for discharging a commodity into the container, a rigid and a tiltable beam associated with the container, said beams being adapted to contact one with the other when a predetermined quantity of a commodity is placed in the container, control means operative upon the conveyor, a plunger rod adjacent the control means adapted to actuate the control means to render the conveyor inoperative, a pawl for retaining the plunger rod in a position inoperative upon the control means, a spring tending to retain the plunger rod in a position operative upon control means and electrical means including an electromagnet embraced in an electrical circuit adapted to be completed when the tiltable and the rigid beams contact one another for releasing the pawl from the plunger rod.

3. In a device of the class described the combination with a pair of scale beams adapted to contact one with the other, electrical contacts mounted upon said beams, an electromagnet, a plunger rod, rack teeth on the plunger rod, a spring operative upon the plunger rod, a pawl pivotally mounted adjacent the plunger rod and adapted to engage the teeth thereon to retain the plunger rod in position against the yielding resistance of the spring, a pivotally mounted lever associated with the electromagnet and the pawl for disengaging the pawl from the teeth on the plunger rod and an electrical circuit embracing the electromagnet and the contacts on the scale beams adapted to be completed upon engagement of said contacts for energizing the electromagnet whereby the lever will disengage the pawl from the teeth on the plunger rod.

4. In a device of the class described the combination with a mixing bin of a supply bin, a sifting mechanism mounted above the mixing bin, a conveying mechanism for carrying a substance from the supply bin to the sifting mechanism, a container mounted intermediate the sifter and the mixing bin for receiving a quantity of substance from the sifter and adapted to discharge said substance into the mixing bin, a unitary power means for actuating the conveyor, sifting mechanism, and mixing bin, a scale mechanism associated with the container and electrically controlled means associated with the scale mechanism and the power means for rendering the power means inoperative on the conveyor and sifter when the sifter has discharged a predetermined quantity of substance into the container.

5. In a device of the class described, the combination with a clutch lever, of means tending to retain the clutch lever in an inoperative position, means for rendering the first-mentioned means inoperative whereby the clutch lever is free for manual operation independently of the first-mentioned means, and electromechanical means operative upon the second mentioned means whereby the first-mentioned means is released from influence of the second-mentioned means for moving the clutch lever to an inoperative position.

In testimony whereof, I have hereunto subscribed my name this 26th day of April, 1924.

WILLIAM G. KIRCHHOFF.